(12) United States Patent
Lecointre et al.

(10) Patent No.: US 8,131,430 B2
(45) Date of Patent: Mar. 6, 2012

(54) VEHICLE WITH CONTROL OF ELEMENTS WITH NEGATIVE TORQUE FOR THE REGULATION OF ITS OWN DYNAMICS

(75) Inventors: Bruno Lecointre, Saint Germain en Laye (FR); Emmanuel Lannelongue, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 742 days.

(21) Appl. No.: 12/294,864

(22) PCT Filed: Mar. 19, 2007

(86) PCT No.: PCT/FR2007/050951
§ 371 (c)(1),
(2), (4) Date: Sep. 26, 2008

(87) PCT Pub. No.: WO2007/110527
PCT Pub. Date: Oct. 4, 2007

(65) Prior Publication Data
US 2009/0281693 A1 Nov. 12, 2009

(30) Foreign Application Priority Data
Mar. 27, 2006 (FR) ...................................... 06 02655

(51) Int. Cl.
*G05D 1/00* (2006.01)

(52) U.S. Cl. ................ 701/48; 701/36; 701/54; 701/84; 340/438

(58) Field of Classification Search .................... 701/33, 701/36, 48, 54, 70, 71, 78, 83, 84, 87; 180/170; 340/438; 477/107, 110
See application file for complete search history.

(56) References Cited

U.S. PATENT DOCUMENTS
6,098,007 A * 8/2000 Fritz ............................... 701/93
6,339,739 B1 * 1/2002 Folke et al. ..................... 701/70
2005/0130796 A1 6/2005 Loeffler et al.

FOREIGN PATENT DOCUMENTS
DE 3525107 A 2/1986
(Continued)

OTHER PUBLICATIONS
International Search Report mailed Aug. 6, 2007 in PCT/FR2007/050951.

*Primary Examiner* — Gertrude Arthur Jeanglaude
(74) *Attorney, Agent, or Firm* — Nicolas E. Seckel

(57) ABSTRACT

A vehicle includes a device for controlling negative torque having a central control unit; an internal combustion engine; a device for braking the wheels; an input for a resistive torque; at least one element with negative torque (generator, alternator, air conditioning compressor, lighting); and at least one device for regulating each element. The central control unit controls each regulating device in order to meet the resistive torque demand.

8 Claims, 1 Drawing Sheet

FOREIGN PATENT DOCUMENTS

| | | |
|---|---|---|
| EP | 0335086 A | 10/1989 |
| EP | 1081005 A | 3/2001 |
| FR | 2743761 A | 7/1997 |
| GB | 2397138 A | 7/2004 |
| WO | WO 03/059674 A | 7/2003 |
| WO | WO 2005/115784 A | 12/2005 |

* cited by examiner

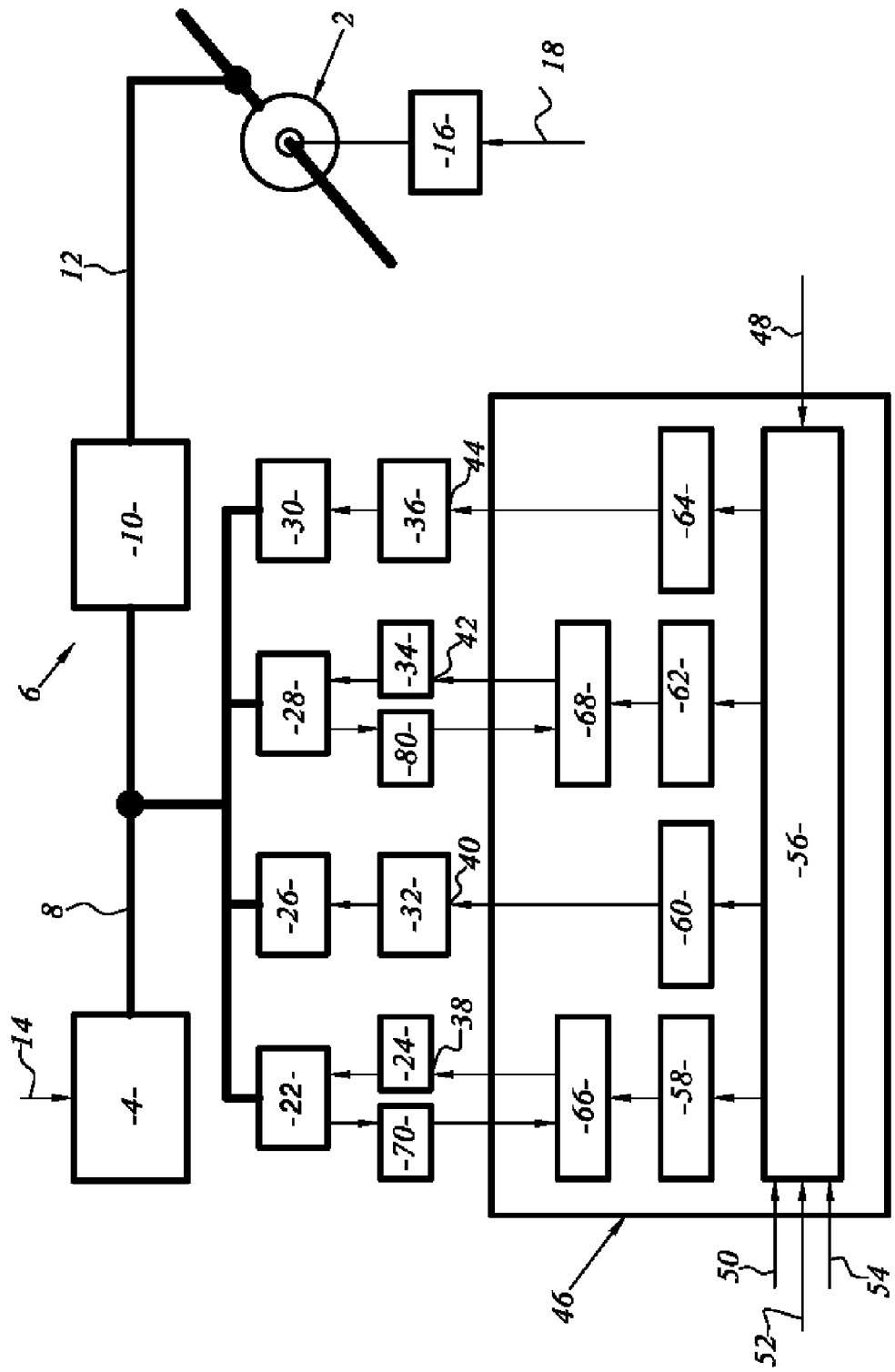

VEHICLE WITH CONTROL OF ELEMENTS WITH NEGATIVE TORQUE FOR THE REGULATION OF ITS OWN DYNAMICS

BACKGROUND ART

The invention relates to a wheeled motor vehicle provided with a control device for regulating the longitudinal dynamics of the vehicle, such as speed, for example.

Traditionally, a motor vehicle using an automatic transmission system to control its speed operates by increasing the engine fuel supply for uphill control, and using the engine brake for downhill control.

It is well known that, for a fixed transmission ratio, the engine brake control capability going downhill is very limited compared to the uphill control, and that the only degree of freedom, which consists in changing the transmission ratio of the gearbox, in the case of a controlled gearbox, has inconveniences, such as the noise produced by increasing the engine speed, and jolting during a change in the transmission ratio.

It is also known that the wheel brakes must be used only in certain instances to assist the engine brake, and that such an action does not ensure smooth control of the vehicle speed going downhill, either.

SUMMARY OF THE INVENTION

The technical problem is thus the inadequacy of the engine brake for effectively and smoothly controlling the speed of a motor vehicle going downhill.

The purpose of the invention is thus to allow more effective speed control for the vehicle when it is decelerating.

To this end, an object of the invention is a wheeled motor vehicle intended to regulate a longitudinal dynamics, speed in particular, comprising:
  a control unit;
  an internal combustion engine;
  an input for requesting a resistive torque;
  a wheel braking device carried on a wheel shaft;
  at least one member with negative torque, external to the engine and the wheel braking device, that is capable of increasing the resistive torque of the engine by acting on the engine;
  at least one control device associated with the or each member with negative torque, that can activate the coupling between the or each negative torque member and the engine, so that the engine drives the negative torque member,
characterized in that the control unit comprises control means for the or each control device for the or each negative torque member actuated in response to said input for requesting a resistive torque.

According to particular embodiments, the vehicle has one or more of the following characteristics:
  the motor vehicle comprises at least two members with negative torque, external to the engine and the wheel braking device, capable of increasing the resistive torque of the engine, and the at least two negative torque members can be actuated in response to said input for requesting a resistive torque;
  the or each negative torque member is a member selected from the group consisting of a controlled alternator, a load coupled to an alternator, an air conditioning compressor, a fan, a member directly linked to a drive train, and a kinetic energy recovery device;
  the control unit comprises a negative torque signal allocation unit capable of:
    receiving said input for requesting a resistive torque; and
    determining an allocation of signals for negative torque to be supplied by the negative torque members in response to said input and conditions of the negative torque members;
  the allocation unit for the negative torque resources is additionally capable of:
    receiving as input an authorization to activate the negative torque members;
    receiving at an input remote measurements of the condition parameters of the or each negative torque member; and
    receiving at an input remote measurements of the condition parameters of the vehicle, other than the condition parameters of the negative torque members;
  the control unit is capable of converting the allocated signals for negative torques to be supplied by the negative torque members into local signals that can be processed directly and respectively by the control devices for the negative torque members, using a respective local format;
  the local signals are digital or analog magnitudes;
  the vehicle comprises at least one local measuring device associated with the or each negative torque member, respectively, that is capable of:
    measuring the negative torque actually applied by the associated negative torque member; and
    sending to the control unit a local measurement using the same local format for the local signal associated with the negative torque member, and
  the control unit is capable of receiving the local measurement, comparing it to the local signal, and formulating a local command in the local format to send to the control device associated with the negative torque member.

BRIEF DESCRIPTION OF THE DRAWING

The invention will be more easily understood by reading the following description, given only as an example, and referring to the annexed drawing, in which the sole FIGURE is a block diagram of a motor vehicle devised for controlling its own speed.

DETAILED DESCRIPTION OF PARTICULAR EMBODIMENTS

A motor vehicle designed to control its own longitudinal speed is schematically shown in the FIGURE. The motor vehicle comprises drive wheels 2 (only one wheel is shown) driven by an internal combustion engine 4 via a traditional transmission system 6. The latter has a main shaft 8 coming out of the engine 4, a transmission gearbox 10, and a secondary shaft 12 coming out of the gearbox 10.

The combustion engine 4 is provided with an engine control input 14 that serves to control the engine 4 fuel supply.

The wheels 2 are provided with a traditional braking device 16—disk brakes in this case—that has a brake control input 18 that enables control of the brakes 16.

The vehicle also comprises auxiliary members driven by the engine, which are negative torque members 22, 26, 28, 30—four in this case—that can contribute to obtaining a resistive torque, that resists the driving torque of the wheels.

The first negative torque member here is a fan 22 that serves to ventilate a vehicle passenger compartment. The fan 22 traditionally comprises a propeller and an electric drive motor, not shown. The electric motor of the fan 22 is powered by a first alternator, not shown, via a voltage generator 24. The first alternator is coupled to a shaft of the assembly formed by the internal combustion engine 4 and the transmission system 6. In addition, the electric motor is speed controllable through its voltage supply input.

The second negative torque member is a kinetic energy recovery device 26, coupled to a second alternator, not shown, that serves to charge an electric drive battery, not shown.

Here, the third negative torque member is an air-conditioning compressor with adjustable outlet pressure 28 that makes it possible to compress a liquid in the air conditioning circuit and thereby increase the heat extraction capacity of the liquid.

The compressor shaft is directly connected to a shaft of the assembly formed by the internal combustion engine 4 and the transmission system 6.

The fourth negative torque member is a set of constant consumption light bulbs 30 powered by an auxiliary battery—not shown here—electrically coupled to the second alternator.

Each negative torque member 22, 26, 28, 30 is actuated by a negative torque member control device 24, 32, 34, 36, respectively.

The first member control device 24, associated in this instance with the accessory member 22, is the above-mentioned voltage generator in this case, powered by the first alternator. The voltage generator 24 outlet is plugged into the power input of the traditional electric motor. The voltage outlet of the voltage generator 24 is actuatable by an auxiliary voltage input 38.

The second member control device 32, which is associated herewith the kinetic energy recovery device 26, in this case is a first relay actuatable by a voltage input 40, capable of connecting the second alternator to the electric drive battery in response to the input 40 voltage value.

The third member control device 34, which is associated with the air conditioning compressor 28, comprises a solenoid valve actuated by a digital signal input 42 to increment/decrement the valve opening.

The fourth member control device 36, which is associated with the set of light bulbs 30, is an electromechanical relay in this case, actuated by a voltage input 44, capable of turning on the power supply line connection to the light bulb assembly.

The negative torque member control devices 24, 32, 34, 36 are input controlled by a control unit 46, in response to an input 48 for requesting a set resistive torque.

The control unit 46 is also provided with a first input 50 for control activation, a second input 52 for providing condition parameters of the negative torque members, and a third input 54 for providing condition parameters of the rest of the vehicle, such as speed and engine fueling.

The control unit 46 comprises an allocation unit 56 for the negative torque signals to be supplied by the negative torque members 22, 26, 28, 30 using an algorithm (or a chart) that takes into account the negative torque capacity and availability of each of the members 22, 26, 28, 30, as well as the input 48 demand for resistive torque to be supplied.

The control unit 46 additionally comprises conversion units 58, 60, 62, 64 for the signals produced by the allocation unit 56 and associated with the negative torque members 22, 26, 28, 30, respectively, for conversion into local signals respectively associated with the preceding members, using respective local formats.

In this case, the local format required at the voltage generator 24 input 38, determined by the first converter 58, is an analog voltage whose value is between 0 and 9 volts. The local format required by the relay 32, which is prescribed and provided by the second converter 60, is a voltage pulse of 12 volts of energy adequate to toggle the relay 32.

The local format prescribed and provided by the third converter 62 as input to the solenoid valve is in the form of a so-called "serial input" digital TTL signal.

The local format prescribed by the fourth converter 64 to the relay 36 is similar to that provided by the second converter 60.

The local signals obtained as output from the converters 60 and 64, respectively, are so-called open-loop direct commands from the control devices 32 and 36.

The local signals obtained as output from the converters 58 and 62, respectively, are local signals provided as input to servomechanisms 66 and 68, respectively, which are integrated into the control unit 46, and are associated with the negative torque members 22 and 30, respectively.

The vehicle control device in this case comprises two local measuring devices 70, 80 for the negative torques actually applied by the negative torque members 22 and 30, respectively. The measuring devices make it possible to provide measurement signals as input to the servomechanisms 66 and 68, respectively.

The first measuring device 70, which is associated with the fan accessory member 22, is a tachometer in this case, followed by a measurement format converter. The second measuring device 80, which is associated with the air-conditioning compressor 28, is a valve opening sensor, followed by a measurement format converter.

In operation, the vehicle is going downhill and its fuel supply is then cut off. An order to supply resistive torque is sent to the input 48 of the control unit 46 in order to assist the engine brake. This order is validated via the first input 50 by the activation order from the control unit 46. The control unit 46 is then authorized to prescribe appropriate commands to be sent to the various negative torque members in order to meet the demand for resistive torque.

Through its negative torque signal allocation unit 56, the control unit 46 receives information on its second input 52 indicating the negative torque capacity and availability of each of the negative torque members 22, 26, 28, 30. The control unit 46 also receives a report of the vehicle speed and engine fuel supply on its third input 54.

The signal allocation unit next determines the values of the negative torque signals associated with the respective negative torque members 22, 26, 28, 30 as a function of the information received on the second and third inputs 52, 54, using a resource distribution algorithm (or chart) for negative torque to be supplied by the associated members 22, 26, 28, 30.

Having at least one available negative torque resource that can be actuated in response to a demand for resistive torque makes it possible to increase the available negative torque and make braking with the engine brake more effective.

Moreover, because the negative torque value of a negative torque member is lower than a traditional wheel brake, some granularity is gained in the braking dynamics, which extends them, but without abrupt changes or jolting, the hallmark of high-quality control dynamics.

The two above-described advantages are enhanced by having at least two, or even a large number of, negative torque members having low-amplitude torque compared to traditional wheel braking.

Furthermore, the possibility that some negative torque members—in this case, the fan accessory member 22 and the variable opening solenoid valve 28—can control the negative torque value continuously or almost continuously imparts even more modularity to control dynamics by introducing finer levels of negative torque control.

Once the negative torque signals are thus prescribed, they are formatted by the torque signal converters 58, 60, 62, 64 as local signals.

The local signals coming from 60 and 64 are run directly as commands by the open-loop control devices 32 and 36.

The local signals coming from 58 and 64 serve as references for the servomechanisms 66 and 68, respectively. Each servomechanism 66, 68 controls the execution of the respective local signal in a closed-loop system by comparing the measurement of the negative torque produced by the respective negative torque member 22, 28 with the local signal, and corrects any variation observed with a command from the respective member control device 24, 34.

The invention claimed is:

1. Motor vehicle with control of a longitudinal dynamics, comprising:
    a control unit;
    an internal combustion engine;
    an input for requesting a resistive torque;
    a braking device for the wheels carried on a wheel shaft;
    at least one member with negative torque, external to the engine and the braking device for the wheels, that is capable of increasing the resistive torque of the engine by acting on the engine;
    at least one control device, associated with the at least one member with negative torque, that makes it possible to activate a coupling between the at least one member with negative torque and the engine, so that the engine drives the negative torque member,
    wherein the control unit controls the at least one control device for the at least one negative torque member as a function of said input for requesting a resistive torque.

2. Motor vehicle according to claim 1, which comprises at least two members with negative torque, external to the engine and the braking device for the wheels, capable of increasing the resistive torque of the engine, and wherein the at least two negative torque members can be actuated in response to said input for requesting a resistive torque.

3. Motor vehicle according to claim 1, wherein the at least one negative torque member is a member selected from the group consisting of a controlled alternator, a load coupled to an alternator, an air conditioning compressor, a fan, a member directly linked to a drive train, and a kinetic energy recovery device.

4. Motor vehicle according to claim 1, wherein the control unit comprises a negative torque signal allocation unit capable of:
    receiving said input for requesting a resistive torque; and
    determining an allocation of signals for negative torque to be supplied by the at least one negative torque member in response to said input and conditions of the negative torque members.

5. Motor vehicle according to claim 4, wherein the allocation unit is additionally capable of:
    receiving as input an authorization to activate the at least one negative torque member;
    receiving at an input remote measurements of condition parameters of the at least one negative torque member; and
    receiving at an input remote measurements of condition parameters of the vehicle, other than the condition parameters of the negative torque members.

6. Motor vehicle according to claim 4, wherein the control unit is capable of converting the allocated signals for negative torques to be supplied by the negative torque members into local signals that can be processed directly and respectively by the at least one control device for the at least one negative torque member, using a respective local format.

7. Motor vehicle according to claim 5, wherein local signals at the input are digital or analog magnitudes.

8. Motor vehicle according to claim 6, which comprises at least one local measuring device associated with the at least one negative torque member, respectively, that is capable of:
    measuring the negative torque actually applied by the associated negative torque member; and
    sending to the control unit a local measurement using the same local format as the local signal associated with the negative torque member, and
    wherein the control unit is capable of receiving the local measurement, comparing it to the local signal, and formulating a local command in the local format to send to the control device associated with the negative torque member.

* * * * *